(No Model.)

C. E. TOPPING.
AMALGAMATOR.

No. 260,256. Patented June 27, 1882.

Witnesses:
J. W. Garner
W. S. D. Haines

Inventor:
C. E. Topping
per
F. A. Lehmann
Atty

UNITED STATES PATENT OFFICE.

CHARLES E. TOPPING, OF SOCORRO, TERRITORY OF NEW MEXICO.

AMALGAMATOR.

SPECIFICATION forming part of Letters Patent No. 260,256, dated June 27, 1882.

Application filed February 6, 1882. (No model.)

*To all whom it may concern:*

Be it known that I, CHAS. E. TOPPING, of Socorro, in the county of Socorro and Territory of New Mexico, have invented certain new and useful Improvements in Amalgamators and Concentrators; and I do hereby declare the following to be a full, clear, and exact description of the invention, such as will enable others skilled in the art to which it pertains to make and use it, reference being had to the accompanying drawings, which form part of this specification.

My invention relates to an improvement in amalgamators and concentrators; and it consists, first, in the combination of a pipe composed of a number of interchangeable conical sections, each one of which has an enlargement or shoulder formed in it to hold mercury, and having one of its ends formed so as to catch over the end of the next adjoining section, with a supporting-frame, a hopper, and screw-conveyer; second, the combination of the frame in which the hopper is placed, the hopper, conveyer, pipe through which the ore and earth are passed, and which is made in sections, and an extensible frame for supporting the outer end of this pipe, as will be more fully described hereinafter.

Figure 1:
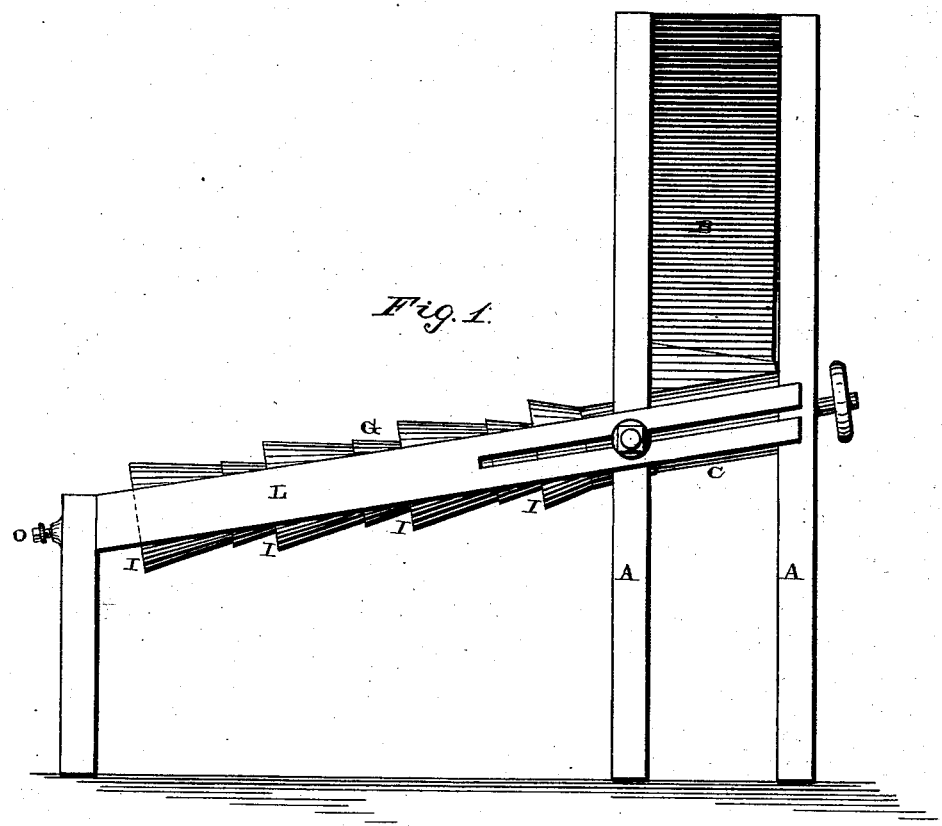
Figure 2:
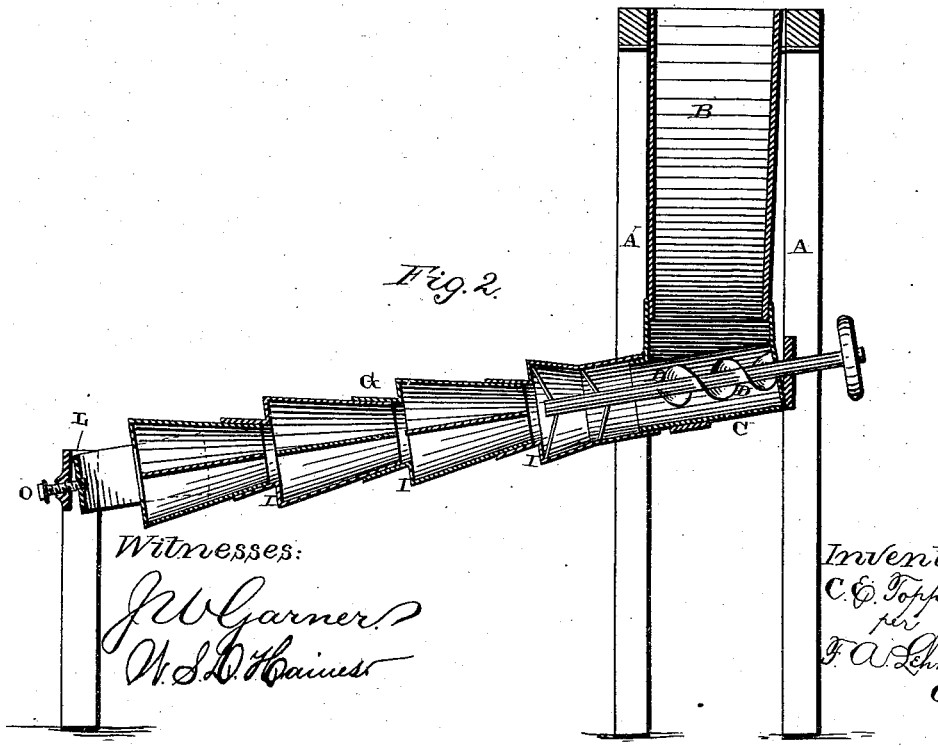

Figure 1 is a side elevation of my invention. Fig. 2 is a vertical cross-section of the same, taken through the hopper and the tube.

A represents a suitable rectangular frame, in which the hopper B is secured. Into this hopper is to be placed the earth or reduced ore containing the gold or silver. Secured to the lower portion of this hopper is a suitable tube or chamber, C, in which the screw D is made to revolve by any suitable power, which is applied to the outer end of its shaft. This shaft is journaled in any suitable manner in the frame A and the end of the tube C, while the inner end of the screw is fastened rigidly to the inner section of the revolving tube G. This screw serves to feed the earth or reduced ore from the hopper directly into the tube. This tube G is made of a number of separate and distinct sections, each one of which is made preferably of the shape shown, so as to have the abrupt shoulder I formed at its largest part. This shoulder I serves as a receptacle for the mercury, which is to be placed in each section for the purpose of attracting the silver or gold which may be in the earth or ore that is constantly passing through the tube as it is caused to revolve with the screw. Also placed in each one of these sections will be suitable amalgamated plates, which also serve to attract the gold or silver as it passes through. The tube is placed at a suitable incline, so that the earth or reduced ore will flow constantly through without the slightest danger of clogging or stopping up the tube.

As it may be desirable in working certain kinds of earth or ore to have a much longer tube than others, the frame L, which supports the outer end of the tube, is made adjustable in relation to the frame A for the purpose of permitting a larger or smaller number of sections being used. As here shown, the inner ends of the frame L are made slotted, and suitable set-screws are passed through these slots into the frame A. By tightening the set-screws the frame L can be held rigidly in any desired position, and by loosening the screws the frame can be drawn outward to any desired distance.

Passed through the outer side of the frame L is a suitable set-screw, O, which has its inner end pointed, and this pointed end serves as a bearing for the outer end of the revolving tube.

My machine is intended to be used either in connection with dry earth or quartz, or water may be poured into the hopper with the earth or reduced ore. This water will form a mud or paste, which in flowing through the tube will allow the heaviest portions to settle to the bottom, and thus come in contact with the mercury and form an amalgam more quickly than where the dry process is used. The incline of the tube and its revolving motion do away with all necessity for a head of water to force the dirt and ore through the tube, and in case water should be scarce it can be caught at the end of the tube in any suitable receptacle, and after the tailings have settled to the bottom the water can be pumped back into the hopper again, and thus used over and over.

When it is desired to clean out the tubes it is only necessary to remove the set-screw O and take off one section of the pipe at a time and empty its contents into a gold-pan. The amalgamated plates are to be removed with nippers and the adhering ore brushed off with a stiff brush.

Having thus described my invention, I claim—

1. In an amalgamator, a pipe composed of a number of interchangeable conical sections, each one of which has an enlargement or shoulder formed in it to hold mercury, and having one of its ends formed so as to catch over the end of the next adjoining section, in combination with a supporting-frame in which the pipe is made to revolve while the ore or earth is passing through it, a hopper, and a screw-conveyer, substantially as shown.

2. In an amalgamator, the combination of the frame A, hopper B, screw-conveyer, pipe G, and extensible frame, substantially as specified.

3. The combination of the frame A and its hopper with the adjustable frame L and a pipe which is made in sections, as described, the outer end of the pipe being supported by the adjustable frame, substantially as shown and described.

In testimony whereof I affix my signature in presence of two witnesses.

CHAS. E. TOPPING.

Witnesses:
LORIAN MILLER,
R. E. McFARLAND.